(12) United States Patent
Clavel et al.

(10) Patent No.: US 8,009,619 B1
(45) Date of Patent: Aug. 30, 2011

(54) SERVER-SIDE WIRELESS COMMUNICATIONS LINK SUPPORT FOR MOBILE HANDHELD DEVICES

(75) Inventors: Philippe Clavel, La Jolla, CA (US); Bryan Waters, Oakhurst, CA (US)

(73) Assignee: Phunware, Inc., Austin, TX (US)

( * ) Notice: Subject to any disclaimer, the term of this patent is extended or adjusted under 35 U.S.C. 154(b) by 825 days.

(21) Appl. No.: 11/977,319

(22) Filed: Oct. 23, 2007

(51) Int. Cl.
H04W 4/00 (2009.01)

(52) U.S. Cl. .......................................... 370/329; 709/203

(58) Field of Classification Search ........................ None
See application file for complete search history.

(56) References Cited

U.S. PATENT DOCUMENTS

| | | | |
|---|---|---|---|
| 5,060,140 A * | 10/1991 | Brown et al. ................. | 710/105 |
| 6,345,279 B1 | 2/2002 | Li et al. | |
| 6,795,710 B1 | 9/2004 | Creemer | |
| 6,884,172 B1 | 4/2005 | Lloyd et al. | |
| 6,996,537 B2 | 2/2006 | Minear et al. | |
| 7,222,154 B2 | 5/2007 | Dowling | |
| 7,286,562 B1 * | 10/2007 | Vargo et al. .................... | 370/468 |
| 7,506,070 B2 | 3/2009 | Tran et al. | |
| 7,580,703 B1 | 8/2009 | Veselov et al. | |
| 7,599,665 B2 * | 10/2009 | Sinivaara .................... | 455/67.16 |
| 7,636,792 B1 | 12/2009 | Ho | |
| 2002/0018487 A1* | 2/2002 | Chen et al. ..................... | 370/465 |
| 2002/0103881 A1 | 8/2002 | Granade et al. | |
| 2002/0109718 A1 | 8/2002 | Mansour et al. | |
| 2002/0131404 A1 | 9/2002 | Mehta et al. | |
| 2003/0018521 A1 | 1/2003 | Kraft et al. | |
| 2003/0106022 A1 | 6/2003 | Goodacre et al. | |
| 2003/0120637 A1 | 6/2003 | Chithambaram et al. | |
| 2003/0182419 A1* | 9/2003 | Barr et al. ..................... | 709/224 |
| 2004/0210907 A1 | 10/2004 | Lau et al. | |
| 2004/0236860 A1 | 11/2004 | Logston et al. | |
| 2004/0252197 A1 | 12/2004 | Fraley et al. | |
| 2005/0223352 A1 | 10/2005 | Nishida | |
| 2006/0031387 A1 | 2/2006 | Hamzeh et al. | |
| 2006/0236308 A1 | 10/2006 | Lamb et al. | |
| 2007/0067373 A1 | 3/2007 | Higgins et al. | |

(Continued)

FOREIGN PATENT DOCUMENTS

EP 1571547 7/2005

(Continued)

OTHER PUBLICATIONS

Grundy, John et al.: "An Architecture for Building Multi-device Thin-Client Web User Interfaces" Advanced Information Systems Engineering, vol. 2348/2002, Jan. 1, 2002, pp. 728-732, XP002511217.

(Continued)

*Primary Examiner* — Hassan Phillips
*Assistant Examiner* — Robert C Scheibel
(74) *Attorney, Agent, or Firm* — Wilson Sonsini Goodrich & Rosati

(57) ABSTRACT

A server-based method for implementing a communications link. The method includes receiving via a communications network a request for a communications link from a client communications component executing on a handheld device and establishing a wireless communications link with the handheld device by using a server communications interface executing on the server. An optimized protocol is automatically implemented between the client communications component and the server based on the wireless communications link type and the handheld device type, wherein the optimized protocol is implemented while maintaining a standardized application programming interface for the server communications interface, and wherein the communications link is established via the communications component functioning with a device API component to configure hardware of the handheld device.

15 Claims, 8 Drawing Sheets

U.S. PATENT DOCUMENTS

| | | | |
|---|---|---|---|
| 2007/0078009 | A1 | 4/2007 | Lockton et al. |
| 2007/0123229 | A1 | 5/2007 | Pousti |
| 2007/0130156 | A1 | 6/2007 | Tenhunen et al. |
| 2007/0130333 | A1* | 6/2007 | Bhalla et al. .................. 709/224 |
| 2008/0016176 | A1 | 1/2008 | Leitner |
| 2009/0037329 | A1 | 2/2009 | Coppinger et al. |
| 2009/0037391 | A1* | 2/2009 | Agrawal et al. .................. 707/3 |
| 2009/0177663 | A1 | 7/2009 | Hulaj et al. |
| 2009/0220068 | A1 | 9/2009 | Vialle et al. |
| 2009/0227274 | A1 | 9/2009 | Adler et al. |
| 2009/0259940 | A1 | 10/2009 | Moraes |

FOREIGN PATENT DOCUMENTS

| | | |
|---|---|---|
| KR | 1020070003418 | 5/2007 |
| KR | 1020080022697 | 12/2008 |
| WO | WO02103963 | 12/2002 |

OTHER PUBLICATIONS

Mir Farooz Ali et al.; "Building Multi-Platform User Interfaces with UIML" Internet Citation, [online] XP002280476 Retrieved from the internet: URL: http://arxiv.org/ftp/cs/papers/0111/0111024.pdf> [Retrieved on May 17, 2004].

Simon, Rainer et al: "Tool-Supported Single Authority for Device Independence and Multimodality" Proceedings of the 7th International Conference on Human Computer Interaction with Mobile Devices & Services, [Online] Sep. 19, 2005, Sep. 22, 2005 pp. 91-98, XP002511216 Retrieved from the interneet: URL: http//portal.acm.org/citation.cfm?id=1085777.1085793> [Retrieved on Jan. 19, 2009].

Thomas Ziegert et al: "Device Independent Web Applications—The Author Once—Display Everywhere Approach" Web Engineering [Lecture Notes in Computer Science, LNCS], Springer-Verlag, Berline/Heidelberg. vol. 3140, Jul. 7, 2004, pp. 244-255, XP019009054.

VanderDonckt, Jean et al: "Synchronised Model-Based Design of Multiple User Interfaces" Internet Article, [online] Sep. 10, 2004, pp. 1-8, XP002511218 Retrieved from the Internet: URL: http://web.archieve.org/web/20040910043454/http://www.isys.uchi.ca.be/cbh/members/qli/put/Vanderdonckt-IHM2001.pdf> [retrieved on Jan. 20, 2009].

Office Action mailed Jul. 30, 2010 for U.S. Appl. No. 11/977,229, filed Oct. 23, 2007.

Office Action mailed Sep. 17, 2009 for U.S. Appl. No. 11/977,212, filed Oct. 23, 2007.

Office Action mailed Dec. 3, 2008 for U.S. Appl. No. 11/977,186, filed Oct. 23, 2007.

Final Office Action mailed May 12, 2009 for U.S. Appl. No. 11/977,186, filed Oct. 23, 2007.

Final Office Action mailed Jun. 29, 2010 for U.S. Appl. No. 12/098,670, filed Apr. 7, 2008.

Office Action mailed Jun. 25, 2010 for U.S. Appl. No. 11/888,799, filed Aug. 1, 2007.

Office Action mailed Jul. 9, 2010 for U.S. Appl. No. 11/977, 186, filed Oct. 23, 2007.

Office Action mailed Sep. 2, 2009 for U.S. Appl. No. 11/977,186, filed Oct. 23, 2007.

Office Action mailed Feb. 16, 2010 for U.S. Appl. No. 11/977,186, filed Oct. 23, 2007.

Office Action mailed Jun. 21, 2010 for U.S. Appl. No. 11/977,212, filed Oct. 23, 2007.

Office Action mailed Jan. 7, 2010 for U.S. Appl. No. 12/098,670, filed Apr. 7, 2008.

International Search Report and Written Opinion mailed Oct. 6, 2009 for International PCT Application No. PCT/US2009/001514, 6 pgs.

International Search Report and Written Opinion mailed Oct. 6, 2009 for International PCT Application No. PCT/US2009/001516, 10 pgs.

Written Opinion mailed Feb. 1, 2010 for International PCT Application No. PCT/US2008/009303, 8 pgs.

Written Opinion mailed Feb. 1, 2010 for International PCT Application No. PCT/US2008/009302, 8 pgs.

U.S. Appl. No. 11/977,212, filed Oct. 23, 2007, entitled "Client-Side Wireless Communications Link Support for Mobile Handheld Devices".

* cited by examiner

SERVER-SIDE WIRELESS COMMUNICATIONS LINK SUPPORT FOR MOBILE HANDHELD DEVICES

TECHNICAL FIELD

The present invention relates generally communications links for wireless mobile handheld devices.

BACKGROUND ART

The use of mobile handheld devices, particularly, devices with wireless communications capabilities, is becoming increasingly popular with consumers. A wide variety of various types of mobile devices are being manufactured by a large number of consumer electronic device manufacturers. For example, in a typical market like the United States, many millions of mobile handheld devices such as, for example, mobile phones, portable computers (e.g., PDAs, micro laptops, etc.), portable media players, and the like are purchased by consumers each year. As the features offered by these devices continued to increase with respect to their richness and depth of functionality, the overall mobile handheld device market continues to expand. This expanding market offers opportunities to those device manufacturers that are best able to satisfy consumer demand.

Much of the unique functionality provided by a wireless handheld device depends upon its ability to connect with other wireless devices and/or a wireless base station and application servers. Examples include cell phones being able to talk to a cell phone base station (e.g., cell tower, etc.) and access an e-mail server. Another example is the ability of a wireless handheld device to talk to a WiFi hotspot, or other such base station. Application functionality (e.g., weather information, stock quotes, news, etc.) is often provided by a server that communicates with the wireless device via the base station.

The ability to establish a reliable wireless communication link between a wireless handheld device and a server (e.g., a server connected to the Internet, etc.) is typically the most critical factor controlling quality of the user experience. A given application's usability and desirability can be dictated by the speed and reliability of the link between the wireless handheld device and the server.

Unfortunately, there are a number problems with the continued expansion of the market for wireless handheld devices. There are a number of different wireless network carriers that employ a number of different wireless technologies (e.g., CDMA, GSM, etc.). Each of these different network carriers utilize a large number of different types of wireless handheld devices, from a large number of different manufacturers. The different network carriers also used different techniques in different technologies to accommodate the changing transmit received conditions as, for example, the mobile users move around (e.g., walking down the street, driving a car, etc.), changing device locations with respect to each other and with respect to any base station. Consequently, an application developer is confronted with a large number of different technology architectures, network topologies, software interfaces, etc., that must be interfaced with and accommodated in order to achieve a sufficiently fast and reliable link between a given wireless handheld device and a server.

Another problem is the fact that an application developer does not have access to a wide array of wireless mobile handheld devices through a reasonable number of conditions or a reasonable number of APIs. There are a large number of different types of handheld devices. Each of these devices varies widely in terms of their capability. Such capabilities include, for example, the power of the embedded CPU, the amount of included RAM, battery power, the communications hardware included, antenna effectiveness, and the like. Depending upon the degree of capability of a given device, the developer must either custom write communications routines or network layer code (e.g., interrupt service routines, Internet protocol stacks, etc.) for more primitive devices, or merely hook into established APIs (e.g., Brew, J2ME, etc.) for more advanced devices, or some combination of the two for devices that are in between. This causes a large amount of developer coding time simply getting an application through QA and debugging to run on a given model of device. Developers simply do not have the time or the resources to take even a single application through a customized QA and debugging process for all the different types of handheld devices that comprise the market.

Thus, what is required is a standardized method for implementing wireless communications links for wireless mobile handheld devices. What is required is a method that can adapt to the various different technologies used to implement a communications link between a handset and a server to provide a standardized way to communicate regardless of the carrier and regardless of the handset type. What is required is a solution that is transparent to an application developer and presents a standardized, device-independent interface. The present invention provides a novel solution to these requirements.

DISCLOSURE OF THE INVENTION

Embodiments of the present invention provide a standardized method for implementing wireless communications links for wireless mobile handheld devices. Embodiments of the present invention provide a method that can adapt to the various different technologies used to implement a communications link between a handset and a server, thereby providing a standardized way to communicate regardless of the carrier and regardless of the handset type. Additionally, embodiments of the present invention provide a solution that is transparent to an application developer and presents a standardized, device-independent interface.

In one embodiment, the present invention is implemented as a server-based method for implementing a communications link with a handheld device. The method includes receiving via a communications network (e.g., the Internet, etc.) a request for a communications link from a client communications component executing on a handheld device and establishing a wireless communications link with the handheld device by using a server communications interface executing on the server. An optimized protocol is automatically implemented between the client communications component and the server based on the wireless communications link type and the handheld device type. The optimized protocol is implemented while maintaining a standardized application programming interface for the server communications interface. The communications link is established via the communications component functioning with a device API component to configure hardware of the handheld device.

In one embodiment, the optimized protocol is selected to be a socket full-duplex connection protocol, a socket half duplex connection protocol, or an HTTP tunneling protocol based on the type of handheld device (e.g., CPU type, RAM, antenna, transceiver, etc.) and a type of carrier network (e.g., CDMA, GSM, etc.). In one embodiment, the optimized protocol is configured to maintain a communications latency of less than one second.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1A:
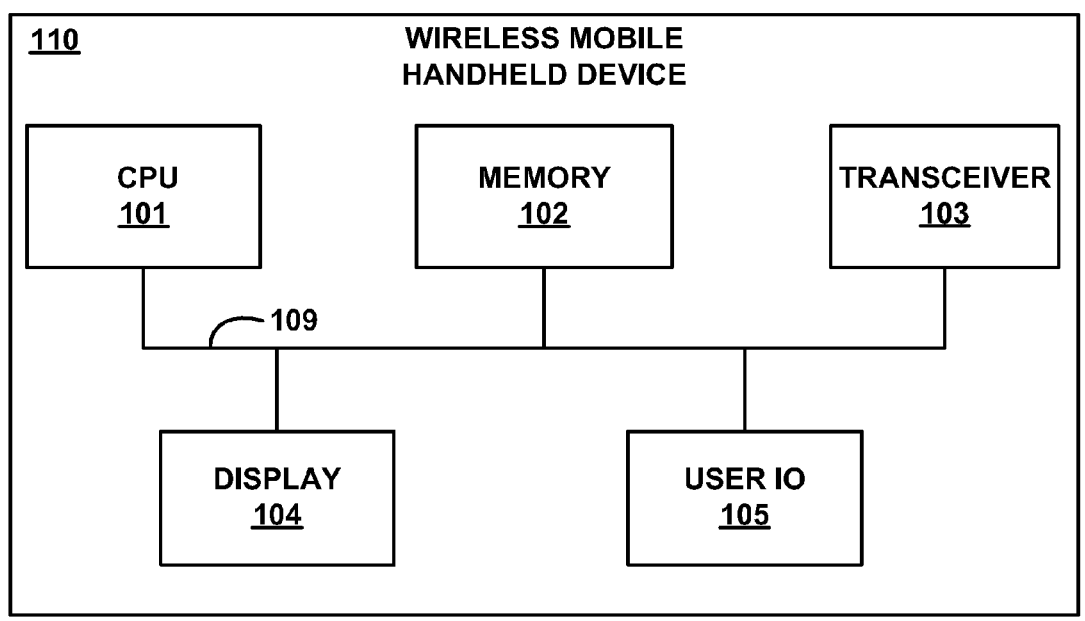
FIG. 1A shows a diagram of an embedded computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions which follow are presented in terms of procedures, steps, logic blocks, processes, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system (e.g., system 100 of FIG. 1A), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

With reference now to FIG. 1A, a computer system 100 in accordance with one embodiment of the present invention is shown. In the FIG. 1A embodiment, the computer system 100 is an embedded computer system that is incorporated within a wireless mobile handheld device 110, and is configured to implement a substantial portion of the functionality of the wireless mobile handheld device 110. Computer system 100 shows the general components of an exemplary embedded computer system that provides the execution platform for implementing certain hardware/software based functionality of the present invention. As described above, certain processes and steps of the present invention can be realized, in one embodiment, as a series of instructions (e.g., software code) that reside within one or more computer readable memory units of a computer system (e.g., system 100). When executed, the instructions cause the system 100 to implement the wireless mobile handheld device functionality of the present invention as described below.

In general, system 100 comprises at least one CPU 101 coupled to a computer readable memory 102 via a bus 109. The system 100 further includes a transceiver 103 coupled to the bus 109 for providing wireless RF transmission and reception of information for the device 110, a display 104 for providing visual status information or other useful data to a user, and a user I/O component 105 for accepting user input (e.g., key pad, click wheel, etc.) and providing various types of user output (e.g., audible speaker output, vibration, flashing LEDs, etc.). Each of the components 103-105 are coupled to the CPU 101 and the computer readable memory 102 via the bus 109 as shown.

EMBODIMENTS OF THE PRESENT INVENTION

Figure 1B:
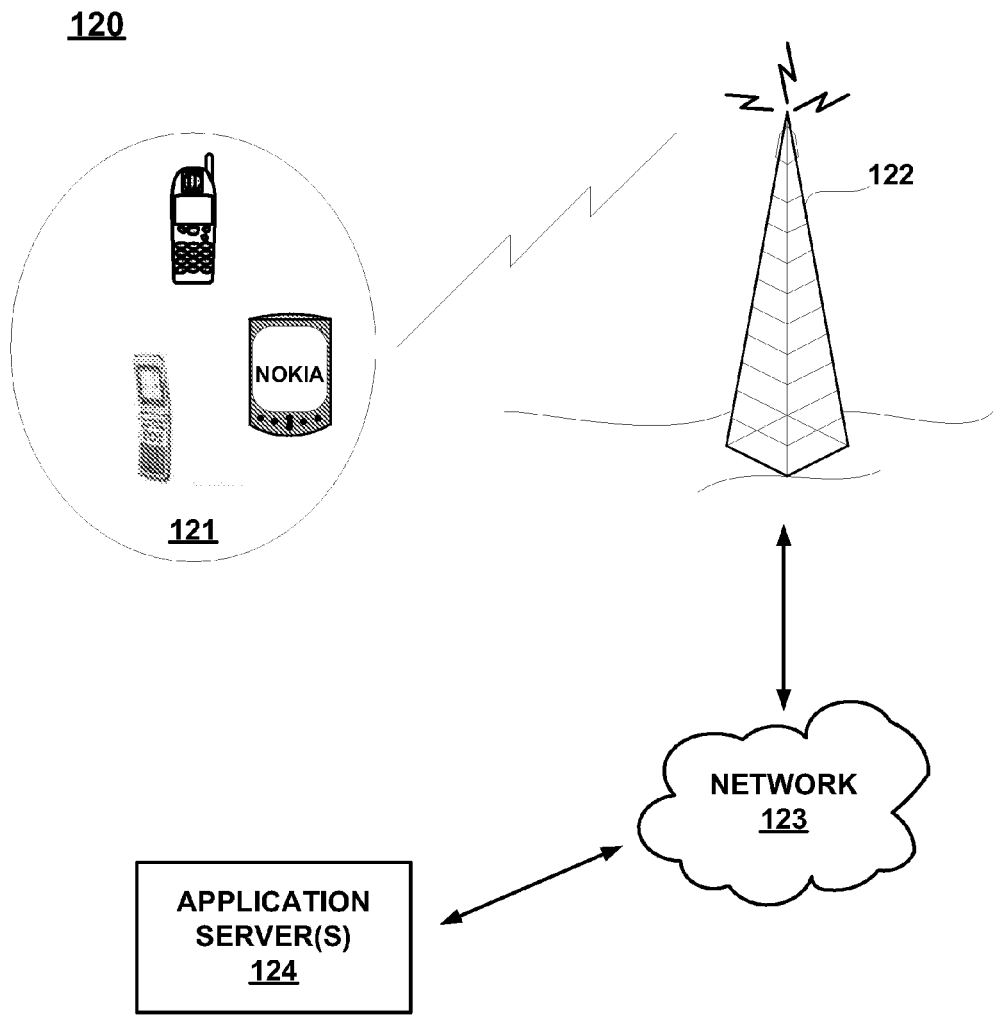
FIG. 1B shows a diagram depicting an exemplary wireless communications system in accordance with one embodiment of the present invention.

FIG. 1B shows a diagram depicting an exemplary wireless communications system 120 in accordance with one embodiment of the present invention. As illustrated in FIG. 1B, a plurality of different types of wireless mobile handheld devices 121 (e.g., hereafter referred to simply as handheld devices 121) are shown communicatively coupled to an RF base station 122. The RF base Station 122 is in turn communicatively coupled to a communications network infrastructure and to one or more application servers 124.

The exemplary wireless communications system 120 embodiment shows the basic elements of a typical cell phone communications infrastructure. The handheld devices 121 are typical cell phone-type devices that communicate with the cell phone carrier base Station 122 via one of a number of different RF cellular carrier techniques (e.g., CDMA, GSM, TDMA, etc.). Typical cell phone type devices can include, for example, traditional cell phones (e.g., clamshell type, flip phone type, etc.), cellular enabled PDAs (blackberry™, Palm™, etc.) cellular equipped palm top computers, and the like. The RF based communication between the handheld devices 121 and the base station 122 is extended into the communications network infrastructure 123 via various components of hardware equipment (e.g., bridge devices, routers, etc.) located at the base station 122 and typically operated by the owner of the base station 122 (e.g., the cell phone carrier).

In most implementations, the network infrastructure 123 comprises the Internet. The messages/data going to and from the handheld devices 121 are transformed at the base station 122 from wireless RF based messages and data into wired electronic or optical signals (e.g., addressing data, packets, frames, etc.) of the network infrastructure 123 (e.g., the Internet). The routing and switching protocols of the network 123 complete the bidirectional communication with the one or more application servers 124, which may be located at a remote location (e.g., different city, different state, different country, etc.) that is connected to the network 123.

Figure 1C:
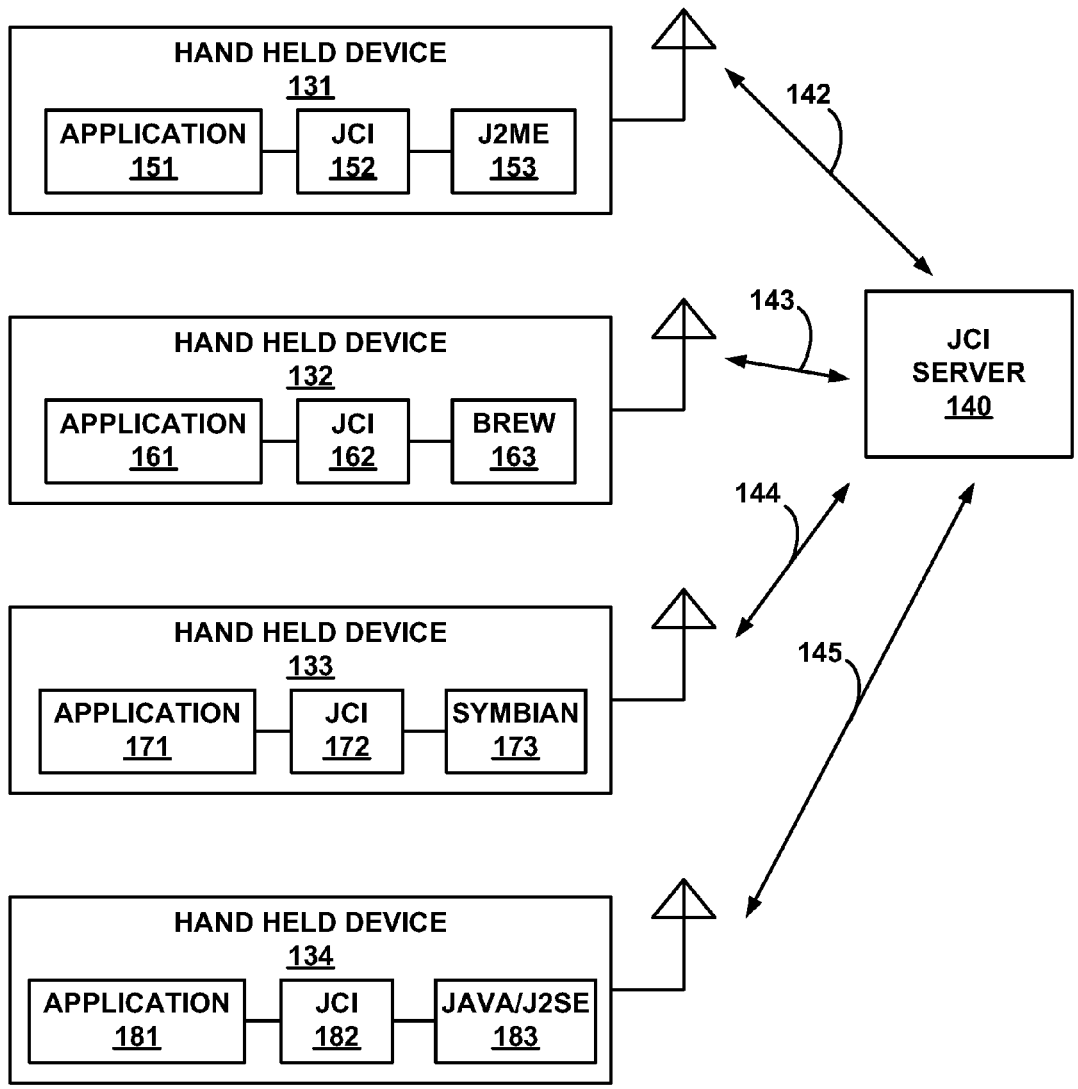
FIG. 1C shows a diagram depicting different types of handheld devices in communication with a communication server in accordance with one embodiment of the present invention.

FIG. 1C shows a diagram depicting different exemplary types of handheld devices 131-134 in communication with a communication server 140 in accordance with one embodiment of the present invention. As diagrammed in FIG. 1C, the server 140 is communicatively coupled via wireless communication links 142-145 to the handheld devices 131-134. The server 140, in conjunction with the software-based application components (e.g., 151, 161, 171, and 181), the client side communication components (e.g., components 152, 162, 172, and 182), and the API components (e.g., components 153, 163, 173, and 183) of the respective devices 131-134 implement the wireless communications functionality of embodiments of the present invention.

The FIG. 1C embodiment shows an overview of the software-based functions executing on the handheld devices 131-132. The functions run on each device's embedded computer system (e.g., computer system 100). For example, with the device 131, the application 151 can be one of the number of different types of handheld device applications (e.g., WAP browser, game application, update utility, etc.). The client side communication component 152 is generally referred to as a JCI component. The JCI component 152 functions with and controls the API component 153 to implement an optimized communications link with the corresponding communication server 140, which is generally referred to as a JCI server (e.g., one of the application servers 124). With the device 131, the API component 153 is a J2ME component.

Similarly, with the device 132, FIG. 1C shows the application 161 with the corresponding JCI component 162 and the API component 163. As with the device 131, the JCI component 162 functions with and controls the API component 163 to implement an optimized communications link between the device 132 and the JCI server 140. However, with the device 132, the API component 163 is a BREW component.

The J2ME component 153 comprises a collection of Java based APIs that were originally designed to facilitate the development of software applications for resource constrained mobile handheld devices. The J2ME specification (e.g., Java 2 Platform Micro Edition) comprises a formal specification having varying degrees of support within the mobile handheld device manufacturing industry. A significant number of mobile handheld device manufacturers have incorporated J2ME support within their devices.

The BREW component 163 similarly comprises a set of APIs that are designed to facilitate the development of software applications for resource constrained mobile handheld devices. The BREW APIs (e.g., Binary Runtime Environment for Wireless) where originally created by Qualcomm™ solely for its proprietary CDMA based mobile phones. The more recent versions of the BREW APIs have been opened somewhat so that they are supposedly "air-interface independent", to facilitate support for other wireless technologies such as GSM/GPRS, UMTS, and CDMA. As with J2ME, a significant number of mobile handheld device manufacturers have incorporated BREW support within their devices.

FIG. 1C further shows the exemplary handheld devices 133 and 134, which are substantially similar to the devices 131 and 132, but alternatively include the Symbian component 173 in the Java/J2SE component 183, respectively. The Symbian component 173 comprises a Symbian OS, which is a proprietary operating system designed for mobile devices, and which includes associated libraries, user interface frameworks, and the like. The Java/J2SE 183 comprises a Java virtual machine and associated Java programming libraries which are designed for cross-platform compatibility. Particularly, the Java/J2SE 183 is designed to enable communication between handheld devices and desktop computer systems (e.g., PCs, Macs, etc.).

Embodiments of the present invention implement a client-side JCI component (e.g., JCI components 152 and 162) that can interact with and control the resident preinstalled components 153, 163, 173, and 183 to implement a communications link with the JCI server 140. As described above, cell phone-based mobile handheld devices tend to incorporate either one of the widely used APIs depending upon whichever allegiance the device manufacturer is part of in a given year.

The client-side JCI components 152, 162, 172, and 182 are configured to interface with and control the API components to implement the best available a per call appropriate for the handheld device type and/or the network type. The JCI components can exchange information with the JCI Server 140 to select the particular communication protocol implemented between the devices 131-134 and the JCI server 140. In general, selection as to which particular communication protocol is to be implemented is made prior to runtime. For example, in one embodiment selection is made at the time when the particular devices are shipped from the manufacturer to the retail outlets.

In this manner, the JCI components 152 and 162 are configured to ensure that the highest link quality is maintained for the applications 151 and 161. In other words, the objective of the JCI components 152 and 162 and the JCI server 140 is to ensure the communications links 142 and 143 have the highest available link bandwidth and lowest available link latency.

In one embodiment, the protocol of the communication links can be dynamically changed. For example, in those cases where there is a temporary degradation in link quality, the particular protocol being used (e.g., protocols 201-204) can be downgraded to maintain connectivity. Once the degradation passes, the protocol is upgraded (e.g., upgraded to socket full-duplex protocol 201) to restore the highest available link quality.

Additionally, in situations where a communications link is unavoidably lost (e.g., the user enters an elevator of a building, passes into a tunnel, etc.), the JCI components 152 and 162 and the JCI server 140 are configured to automatically reestablish the communication link as soon as conditions permit. This capability can enable, for example, the suspension of an online game when connectivity is lost, and the subsequent resuming of the game when connectivity is reestablished without causing a crash, error, or an abnormal termination of the game.

Figure 2:
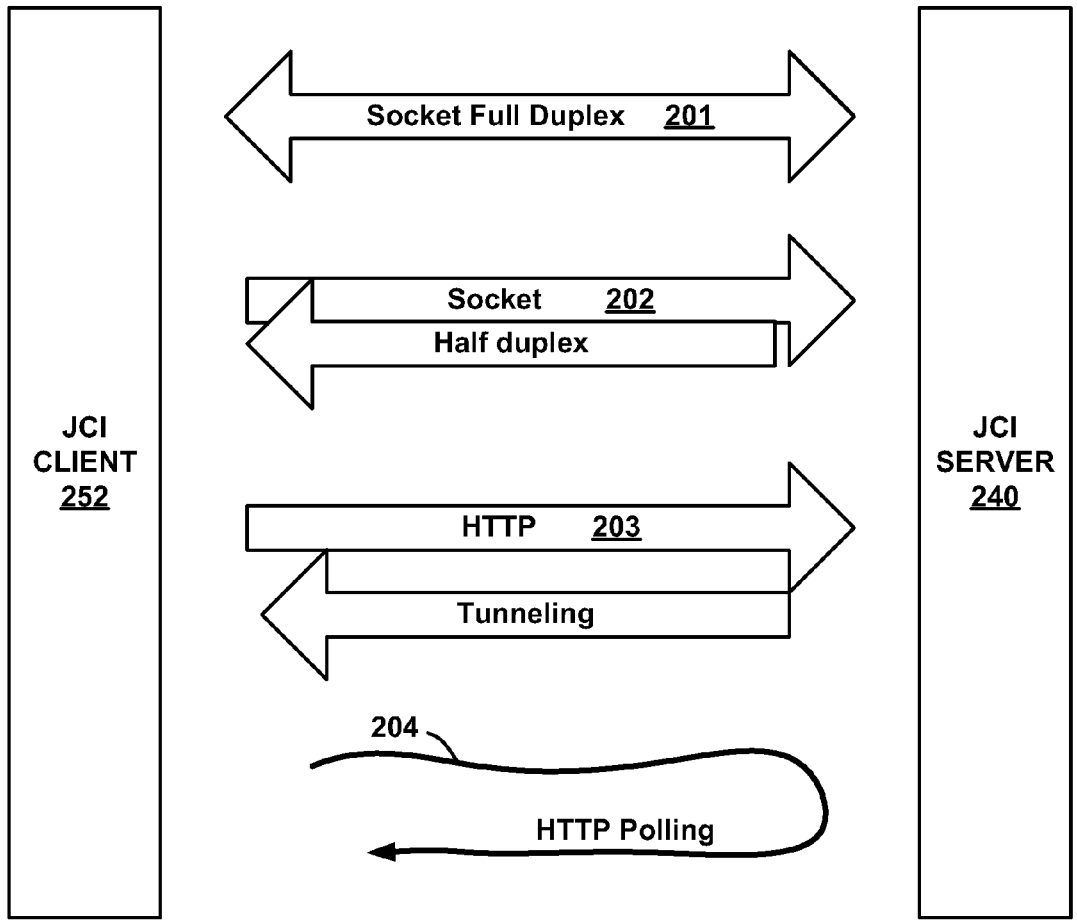
FIG. 2 shows a diagram illustrating different communications protocols which can be selected and implemented by a client-side JCI component and a JCI server in accordance with one embodiment of the present invention.

FIG. 2 shows a diagram 200 illustrating different communications protocols which can be selected and implemented by a client-side JCI component (e.g., JCI client 252) and a JCI server (e.g., JCI server 240) in accordance with one embodiment of the present invention. As depicted in diagram 200, four different communications protocols 201-204 are shown.

The diagram 200 embodiment shows the possible protocols that are available to the JCI client 252 and the JCI server 240 to optimize the communications link between, for example, a particular JCI enabled handheld device and a particular JCI server. As described above, the objective of the JCI client 252 and the JCI server 240 is to ensure their communications link has the highest available link bandwidth and lowest available link latency. The particular one of the protocols 201-204 that is implemented depends upon factors such as, for example, the hardware capabilities of the particular handheld device, the hardware and software functionality of the carrier network, and the like.

In one embodiment, the highest link quality is provided by the full socket duplex protocol 201. In general, the full socket duplex protocol 201 provides the highest link bandwidth and the lowest link latency in comparison to the other depicted protocols. Consequently, the full socket duplex protocol 201 is the preferred link implementation, conditions permitting.

In general, the term "full socket duplex" refers to the fact that an Internet socket (e.g., a "socket" or "network socket") is instantiated at both the JCI client 252 and JCI server 240 for both transmitting and receiving data (e.g., full-duplex). Sockets are communication end-points (e.g., sender, receiver) that are unique to each machine communicating on an Internet Protocol-based network, such as the Internet (e.g., network 123). An Internet socket typically comprises protocol information (e.g., TCP, UDP, raw IP), a local IP address, a local port, a remote IP address, and a remote port. In the full socket duplex protocol 201, the JCI client 252 and JCI server 240 connect the instantiated sockets with a running application (e.g., application 151), or one or more processes executing with or within the application. The application and/or processes use the instantiated sockets to send and receive data over the network 123, and the network's transport protocol (e.g., TCP, UDP, etc.) transports the actual data across the network.

In those cases where the socket full-duplex protocol 201 cannot be implemented, the JCI client 252 and the JCI server 240 will preferably implement the socket half duplex protocol 202. As its name implies, the socket half duplex protocol 202 cannot support the simultaneous transmitting and receiving of data. For example, when the JCI client 252 transmits data to the JCI server 240, the JCI client to 52 cannot receive any data from the JCI server to 40 until its transmission is complete. Once the JCI client 252 completes transmitting data, the link becomes available for the JCI server 240 to transmit data to the JCI client 252. The half duplex operation yields a reduction in the available link bandwidth and a corresponding increase in link latency in comparison to the socket full-duplex protocol 201.

In those circumstances where the socket full-duplex protocol 201 and the socket half duplex protocol 202 cannot be implemented, the JCI client 252 and the JCI server 240 will preferably implement the third option, the HTTP tunneling protocol 203. HTTP-tunneling functions by creating "tunnel" between a first computer system and a second computer system. HTTP-tunneling typically uses one or more mediator servers on the network 123 to encapsulate data and transmit the data between the JCI client 252 and the JCI server 240. HTTP-encapsulated application data travels from, for example, the handheld device 131 to the JCI server 240 via the one or more mediator servers (e.g., from one mediator server to the next). In general, the HTTP tunneling protocol 203 has lower link bandwidth and higher link latency than either the socket full-duplex protocol 201 or the socket half duplex protocol 202.

In those circumstances where conditions are such that the socket full-duplex protocol 201, the socket half duplex protocol 202, and the HTTP tunneling protocol 203, cannot be implemented, the JCI client 252 and the JCI server 240 will implement the fourth option, the HTTP polling protocol 204. The HTTP polling protocol 203 provides a robust connect mechanism that should work adequately even in very adverse network conditions. In the HTTP polling protocol 203, the JCI client 252 makes regular periodic HTTP queries to the JCI server 240, and in effect, continually pings the JCI sever 240 as to whether any messages need to be transmitted from the server 240 to the client 252. Generally, the "pings" between the JCI client 252 and the server 240 allow the immediate transmission and reception of data during the time the HTTP connection between the server 240 and the client 252 remains active (e.g., due to the ping). The HTTP polling protocol incurs a comparatively large amount of overhead, with the JCI client 252 continually polling the JCI server 240 for data. For example, if a large number of handheld devices are implementing HTTP polling, the JCI server 240 will come under a substantial load. Because of this overhead, HTTP polling protocol 203 provides the lowest link bandwidth and the highest link latency in comparison to the other protocols 201-203.

Figure 3:
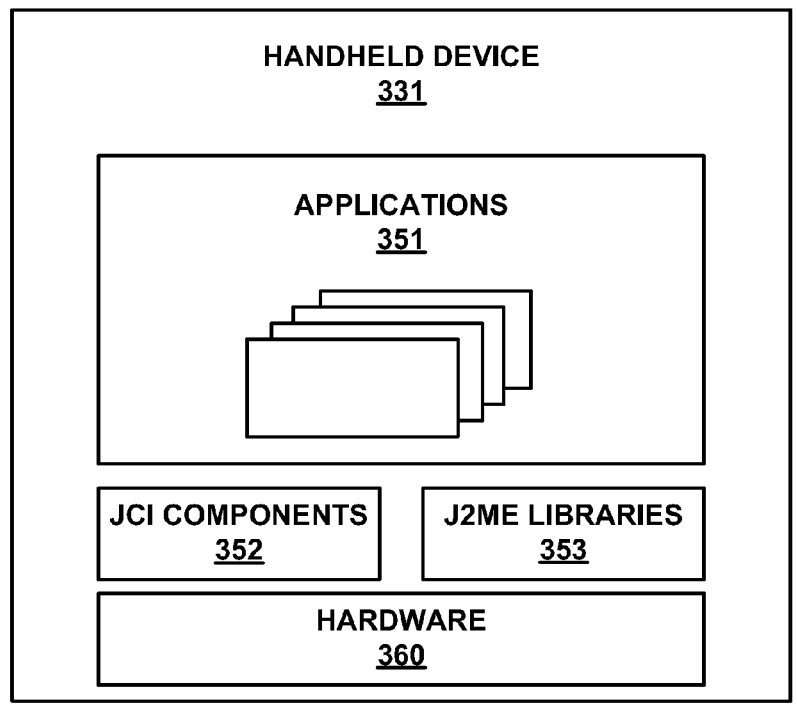
FIG. 3 shows a diagram illustrating the hierarchical relationship between a plurality of applications, a J2ME API component, a JCI component, and a hardware layer of an exemplary handheld device in accordance with one embodiment of the present invention.

FIG. 3 shows a diagram illustrating the hierarchical relationship between a plurality of applications 351, a J2ME API component 353, a JCI component 352, and a hardware layer 360 of an exemplary handheld device 331 in accordance with one embodiment of the present invention. The FIG. 3 embodiment shows the structure of the JCI components 352 and the J2ME libraries 353 with respect to the hardware 360 of the handheld device 331. As described above, the JCI component 352 interfaces with and controls the J2ME libraries 353 to access and control certain hardware interfaces of the handheld device 331. For example, a typical handheld device will provide access to certain hardware functions (e.g., keyboard I/O, transceiver accesses, etc.) through one or more J2ME function calls. The degree of this access and the number of specific functions which are implemented through the J2ME libraries 353 is determined as the device is designed and produced by the manufacturer. Some hardware access functions can be implemented directly by the JCI components 352, while other hardware access functions must be obtained via interaction with (e.g., hooking into, calling, etc.) the installed J2ME libraries 353. Thus, some portions of the JCI components 352 are optimized to interface and interact with the J2ME libraries 353, while other portions of the JCI components 352 are optimized to interface directly with the hardware 360.

The objective of the JCI component 352 is to provide a standardized API that can implement fast reliable communications links for the applications 351 executing on the handheld device 331. As described above, the J2ME libraries 353 do not provide sufficient communications functionality, and as such, cannot be reliably depended upon by the applications 351. In contrast, the JCI component 352 provides a stable and standardized API that the applications 351 can rely on to establish dependable high-quality communications links in the manner described above.

The provision of the standardized API by the JCI component 352 provides a number of advantages. The standardized API implemented by the JCI component 352 provides a standardized method for implementing wireless communication links for handheld devices. This allows an application developer to write applications that interface with the JCI component 352, and avoid any expensive and painful per-device Q&A and debug processing.

Another advantage is the fact that the developer can count on the highest available link quality being implemented by the JCI component 352 (e.g., in combination with a JCI server). This allows the developer to freely implement applications and games with a high degree of rich and compelling interactivity without fear of the applications being unnecessarily crippled by poorly implemented communication links.

Yet another advantage is the fact that the solution implemented by the JCI component 352 is transparent to application developers. Any changes, evolutions, or updates to the J2ME component 353 or to the hardware 360 can be accounted for by appropriate revisions of the JCI component 352. The JCI component 352 can be updated to properly interact with changes to the J2ME component 353, hardware 360, or other aspects of the handheld device 331 (e.g., firmware updates, etc.) while preserving the standardized, device-independent interface.

Figure 4:
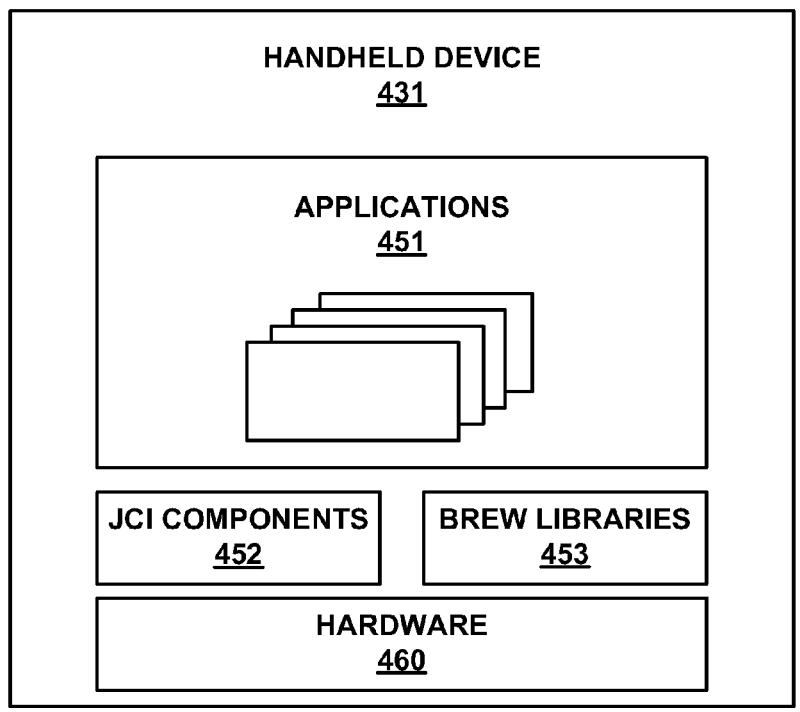
FIG. 4 shows a diagram illustrating the hierarchical relationship between a plurality of applications, a BREW API component, a JCI component, and a hardware layer of an exemplary handheld device in accordance with one embodiment of the present invention.

FIG. 4 shows a diagram illustrating the hierarchical relationship between a plurality of applications 451, a BREW API component 453, a JCI component 452, and a hardware layer 460 of an exemplary handheld device 431 in accordance with one embodiment of the present invention. The FIG. 4 embodiment of the handheld device 431 is substantially similar to the handheld device 331 of FIG. 3, however the handheld device 431 includes the BREW component 453, as opposed to the J2MI component 353.

As described above, the BREW component 452 interfaces with and controls the BREW libraries 453 to access and control certain hardware interfaces of the handheld device 431. This includes accessing certain hardware functions (e.g., keyboard I/O, transceiver accesses, etc.) through one or more BREW function calls, where the degree access implemented is determined by the device manufacturer. As with the handheld device 331 described above, some hardware access functions can be implemented directly by the JCI components 452, while other hardware access functions must be obtained via interaction with (e.g., hooking into, calling, etc.) the installed BREW libraries 453. Thus, some portions of the JCI components 452 are optimized to interface and interact with the BREW libraries 453, while other portions of the JCI components 452 are optimized to interface directly with the hardware 460.

Figure 5:
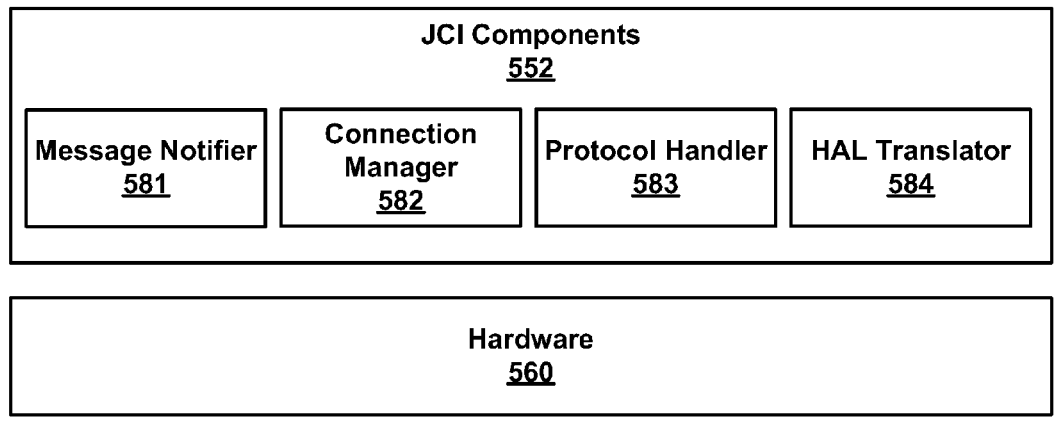
FIG. 5 shows a diagram illustrating the modules which comprise the JCI components in accordance with one embodiment of the present invention.

FIG. 5 shows a diagram illustrating exemplary modules 581-584 which comprise the JCI components 552 in accordance with one embodiment of the present invention. As depicted in FIG. 5, the JCI components 552 include a message notifier module 581, a connection manager module 582, a protocol handler module 583, and a hardware abstraction layer translator 584. The JCI components 552 are shown interfacing with the hardware 560 (e.g., of a handheld device).

The FIG. 5 embodiment shows exemplary software modules which implement certain functionality of the JCI components 552 in accordance with one embodiment of the present invention. The message notifier module 581 comprises those software functions and routines which notify applications (e.g., applications 451) of arriving messages, passes messages from applications to the established link protocol, and the like. The connection manager 582 comprises those software functions and routines which initiate and closes connections (e.g., protocols 201-204) with a corresponding JCI server. The connection manager 582 determines when to upgrade from one protocol to another and vice versa, and when to reestablish a connection when a prior connection is lost.

The protocol handler 583 comprises those software functions and routines which manage the creation and implementation of a communications link through a selected protocol (e.g., protocols 201-204). The hardware abstraction layer translator 584 comprises those software functions and routines which translate standardized API functions of the JCI components 552 to the idiosyncratic device specific functions of the particular handheld device hardware. The various differences between the hardware interfaces and any firmware requirements are handled by the translation functions of the hardware abstraction layer 584.

Figure 6:
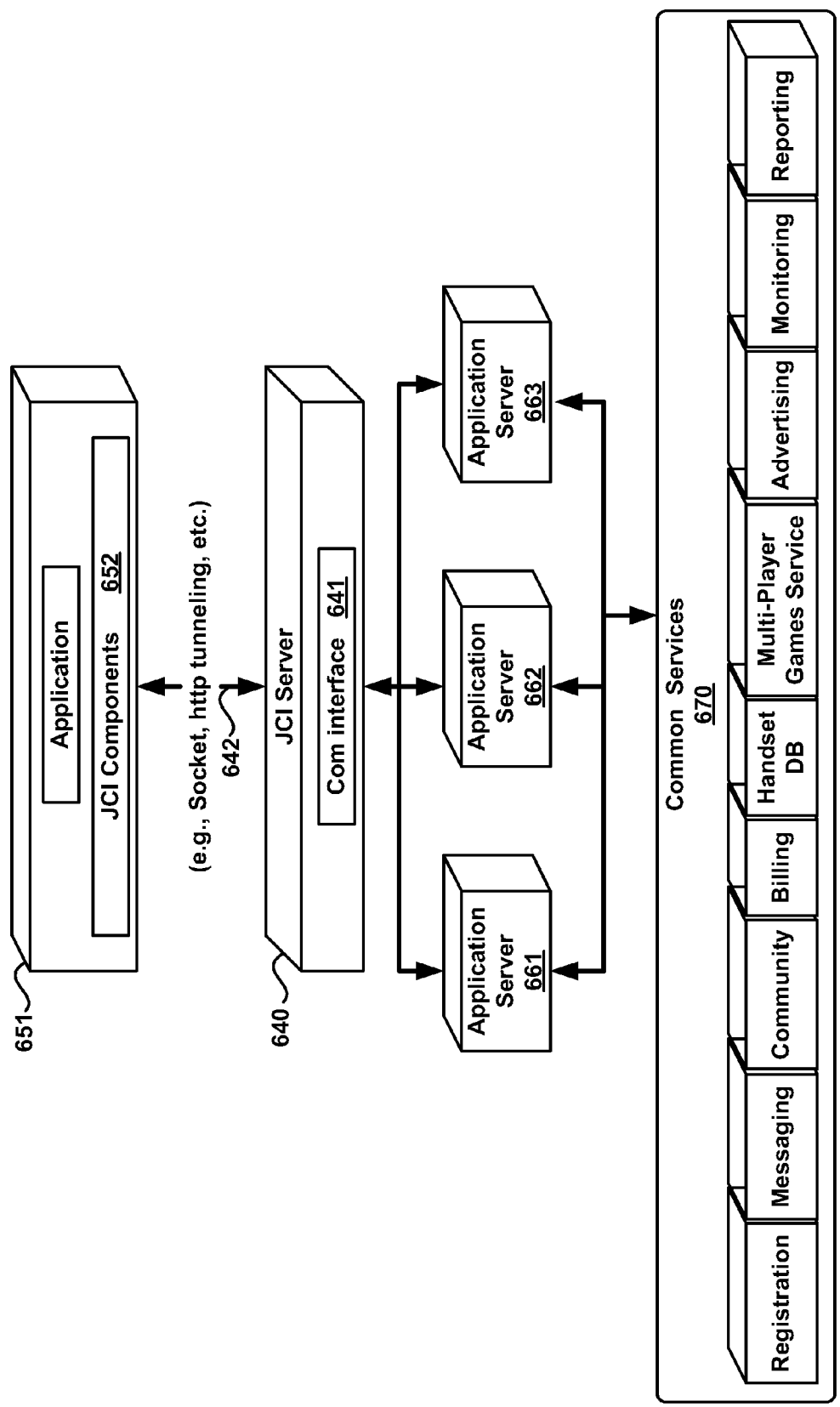
FIG. 6 shows a diagram illustrating the software components on the JCI server-side in accordance with one embodiment of the present invention.

FIG. 6 shows a diagram illustrating the software components on the JCI server-side in accordance with one embodiment of the present invention. As depicted in FIG. 6, the JCI server 640 is coupled to a corresponding JCI component 652 of a handheld device and its corresponding application 651.

The FIG. 6 embodiment shows how the application 651 establishes communication with one or more of a plurality of server-side applications 661-663. The server-side applications 661-663 can communicate with an appropriate client-side application (e.g., application 651 on the handheld device) to deliver compelling and satisfying interactivity to the user (e.g., online multiplayer gaming, multiplayer applications, etc.).

The JCI server 640 automatically implements an optimized protocol 642 between the client communications component (e.g., the JCI components 652) and the JCI server 640 based on the wireless communications link type and the handheld device type. The optimized protocol is implemented while maintaining a standardized application programming interface for the server communications interface 641. The server communications interface 641 is configured to provide a stable and standardized application programming interface for the various applications, services, and the like executing on the application servers 661-663.

The FIG. 6 embodiment further shows a set of common services 670 that can be provided to each of the application servers 661-663. In general, the common services 670 comprise those functions which can apply to a plurality of different applications serving a corresponding plurality of different needs. Certain functions such as, messaging, registration, billing, etc. tend to be common needs across different applications. For example, billing functionality for one application is typically quite similar to billing functionality used by multiple applications. The functions that tend to be common across multiple different types of applications are implemented by common service modules within the set of common services 670.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A server-based method for, comprising:
   receiving, at a server and via a communications network, a request for a communications link from a client communications component executing on a handheld device;
   establishing the communications link with the handheld device using a server communications interface executing on the server;
   automatically implementing, at a first time, a first protocol between the client communications component and the server based on a type of the communications link and a type of the handheld device, the first protocol being implemented while maintaining a standardized application programming interface (API) for the server communications interface, the communications link being established via the client communications component functioning with a device API component to configure hardware of the handheld device; and
   automatically implementing, at a second time after the first time, a second protocol, different from the first protocol, between the client communications component and the server based on a quality of the communications link at the second time, the first protocol and the second protocol being different ones of a socket full-duplex connection protocol, a socket half duplex connection protocol, an HTTP tunneling protocol, and an HTTP polling protocol.

2. The server-based method of claim 1, wherein the device API component is a J2ME component.

3. The server-based method of claim 1, wherein the device API component is a BREW component.

4. The server-based method of claim 1, wherein the device API component is a Symbian component.

5. The server-based method of claim 1, wherein the first protocol is configured to maintain a communications latency of less than one second.

6. The server-based method of claim 1, wherein the client communications component includes a hardware abstraction component for translating between the client communications component and device specific hardware functions of the handheld device.

7. The server-based method of claim 6, wherein the hardware abstraction component is configured to enable the client communications component to implement a stable communications API on multiple different handheld device types.

8. The server-based method of claim 1, wherein a plurality of application servers are configured to communicate with the handheld device via the server communications interface.

9. A server, comprising:
   a processor; and
   a memory coupled to the processor, the memory storing processor readable code that, when executed by the processor, is configured to cause the processor to:
      receive, via a communications network, a request for a communications link from a client communications component executing on a handheld device;
      establish a wireless communications link with the handheld device by using a server communications interface;
      automatically select, as an optimized protocol, a socket full-duplex connection protocol if a quality of the wireless communications link is above or equal to a threshold, or one of a socket half duplex connection protocol, an HTTP tunneling protocol, and an HTTP polling protocol if the quality of the wireless communications link is below the threshold; and
      automatically implement the optimized protocol between the client communications component and the server communications interface, the optimized protocol being implemented while maintaining a standardized application programming interface (API) for the server communications interface, the communications link being established via the client communications component functioning with a device API component to configure hardware of the handheld device.

10. The server of claim 9, wherein the device API component is one of a J2ME component, a BREW component, and a Symbian component.

11. The server of claim 9, wherein a plurality of application servers are configured to communicate with the handheld device via the server communications interface.

12. A non-transitory processor-readable medium storing code representing instructions to cause a processor to:
   receive, via a communications network, a request for a communications link from a client communications component executing on a handheld device;
   establish a wireless communications link with the handheld device using a server communications interface;
   automatically select, as an optimized protocol, a socket full-duplex connection protocol if a quality of the wireless communications link is above or equal to a threshold, or one of a socket half duplex connection protocol, an HTTP tunneling protocol, and an HTTP polling protocol if the quality of the wireless communications link is below the threshold; and
   automatically implement the optimized protocol between the client communications component and the server communications interface, the optimized protocol being implemented while maintaining a standardized application programming interface (API) for the server communications interface, the communications link being established via the client communications component functioning with a device API component to configure hardware of the handheld device.

13. The non-transitory processor-readable medium of claim 12, wherein a plurality of application servers are configured to communicate with the handheld device via the server communications interface.

14. The server-based method of claim 1, wherein the quality of the communications link at the second time is less than a quality of the communications link at the first time.

15. The non-transitory processor-readable medium of claim 12, wherein the optimized protocol is a first optimized protocol, the code representing instructions to cause the processor to automatically implement the first optimized protocol being executed at a first time, the quality of the wireless communications link being the quality of the wireless communications link at the first time, the non-transitory processor-readable medium further comprising code to:
   automatically implement, at a second time after the first time, a second optimized protocol between the client communications component and the server communications interface based on a quality of the wireless communications link at the second time.

* * * * *